Figure 1:
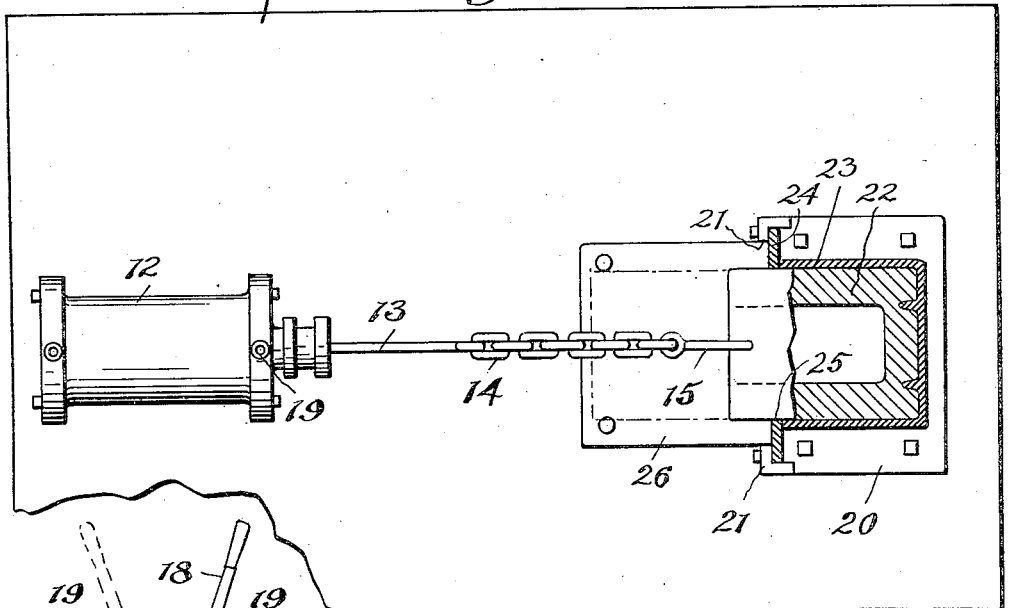

H. L. BOYER.
METHOD OF AND APPARATUS FOR STRIPPING RUBBER JARS FROM CORES.
APPLICATION FILED FEB. 17, 1917.

1,251,175.

Patented Dec. 25, 1917.

Inventor:
Harry L. Boyer
by Thurston & Kwis
Attys

UNITED STATES PATENT OFFICE.

HARRY L. BOYER, OF TRENTON, NEW JERSEY, ASSIGNOR TO JOSEPH STOKES RUBBER COMPANY, OF TRENTON, NEW JERSEY, A CORPORATION OF NEW JERSEY.

METHOD OF AND APPARATUS FOR STRIPPING RUBBER JARS FROM CORES.

1,251,175.  Specification of Letters Patent.  Patented Dec. 25, 1917.

Application filed February 17, 1917. Serial No. 149,209.

*To all whom it may concern:*

Be it known that I, HARRY L. BOYER, a citizen of the United States, residing at Trenton, in the county of Mercer and State of New Jersey, have invented a certain new and useful Improvement in Methods of and Apparatus for Stripping Rubber Jars from Cores, of which the following is a full, clear, and exact description.

This invention relates to method and apparatus for stripping rubber jars, particularly storage battery jars, from cores on which the jars are formed and vulcanized.

Heretofore great difficulty has been experienced in removing rubber storage battery jars from the cores, the method and apparatus used prior to my invention requiring considerable time to remove the jars and having resulted in many jars being broken.

Heretofore to remove a jar from a core it has been customary for a workman to take a pair or set of tongs, the jaws of which have inturned lips, and to grasp the lower end of the core just beneath the jar, with the lips of the tongs engaging the edges of the jar as well as opposite sides of the core, and then to jounce the core and jar up and down giving the jar a jerking action which would tend to pull it from the core. Occasionally a jar could be removed without much difficulty in this manner, but at times they would stick very tenaciously, so that much time was required to remove them. The jouncing operation with the tongs frequently had to be supplemented by tapping or hammering the bottom of the jar, and it often was necessary to insert the narrow flat blade of a tool between the inner sides of the jar and the faces of the core. Often these expedients would not free the jar from the core, and in such cases it became necessary to reheat the core and jar and even at times this would be unavailing. In consequence, and as is obvious, many jars were broken in the process of removing them from the cores, and in any event the average time required to remove a jar was very great. Additionally considerable experience and skill was required by the workman to remove the jars with any degree of success.

The object of the present invention is to provide a method and apparatus by which jars can be removed from the cores quickly and easily with practically no breakage, so that the cost of producing the jars will be decreased and the output materially increased.

In carrying out my invention the jar and core are supported on a horizontal table with the core extending through a suitable opening of an upright stripper plate and with the edges of the jar engaging the face of the plate, and then by suitable source of power which is hooked onto the core, the core is forcibly pulled from the jar, the direction of pull being in line with the core. With this method and apparatus the jars are removed from the cores quickly and methodically, and with practically no breakage.

Figure 2:
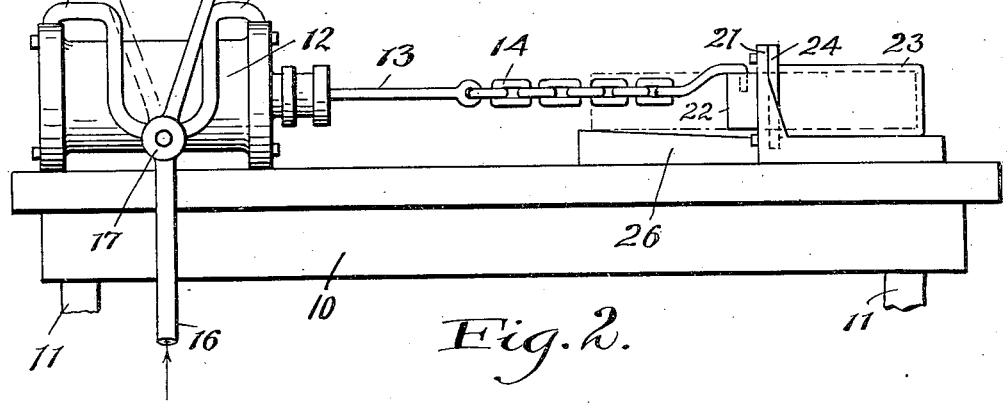
Figure 3:
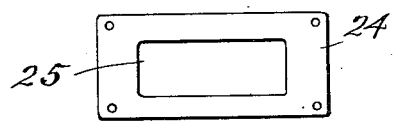

In the accompanying sheet of drawings wherein I have shown the preferred form of apparatus which is utilized in carrying out my method, Figure 1 is a top plan view of the apparatus with parts in section and parts removed; Fig. 2 is a side view of the same; and Fig. 3 is a face view of the stripper plate.

The apparatus which has been used by me in the attainment of the objects of this invention includes a horizontal table 10 which is provided with legs 11 to which rollers or wheels may be secured so that the apparatus can be quickly moved from one point to another where its use is required. This table is of sufficient size that while workmen are engaged in stripping the jars from the cores, other workmen can bring to the table the jars with the cores on them, while other workmen carry away the jars and cores after the latter are stripped from the former with the result that the stripping operation can be carried on with great rapidity. Near one end of the table there is provided a horizontal air cylinder 12 containing a piston, (not shown) having a horizontally movable plunger 13, to which is attached a short length of chain 14, to the free end of which is one or a pair of hooks 15, the purpose of which will be explained subsequently. Air is supplied under suitable pressure alternately to opposite ends of the cylinder so as to drive the piston forwardly and rearwardly by a supply pipe 16, a suitable valve such as a four-way valve 17, a valve operating lever 18, and piping 19 extending from the valve to the opposite ends of the cylinder.

Near the opposite end of the table, and a suitable distance from the cylinder 12 is secured a horizontal plate 20 which is provided with a pair of spaced upstanding arms 21. During the stripping operation the core and the jar which is to be removed therefrom are supported in horizontal position by this plate 20. In this instance the core is shown at 22, all but one end of the core being surrounded by the rubber jar which is shown at 23, the core consisting of a rectangular shaped body of metal, the dimensions and size of which will depend upon the dimensions and size of the jar to be formed. The core may be, and preferably is, made hollow for the sake of lightness. In the use of this apparatus, quantities of the cores 22 with the jars 23 thereon are continuously brought to the table 10 after removal from the vulcanizer, it being understood that the jars were previously formed on the cores before being placed in the vulcanizer.

Against the rear face or faces of the spaced vertical arms 21 is placed and secured a so-called stripper plate 24, having a rectangularly shaped opening 25, just large enough and of the proper dimensions to receive freely the end of the core which projects beyond the jar, so that in the stripping operation the core can be pulled through this opening. When the jar is to be stripped from the core, the core and jar are placed upon the support 20 as shown in the drawings, with the free end of the jar projecting through the opening 25 in the stripper plate and with the edges of the jar engaging the rear face of the stripper plate.

In front of the arms 21 is a plate 26 whose upper surface is inclined forwardly and upwardly so that as the core is pulled from the jar the forward or outer end of the jar will engage this plate just as the core is leaving the jar and prevent the core sagging and breaking the jar.

To pull the core from the jar with the core and jar in the position shown, one operator places the hook or hooks 15 in openings provided in the free end of the core, and then as soon as this is done another operator shifts the valve lever 18 causing a direct pull on the core, this pull being resisted solely by the rubber jar by the engagement of the forward edges thereof with the face of the stripper plate. During the resulting stroke of the piston in the cylinder the core is quickly pulled from the jar without in the least damaging or breaking the jar.

The stripping operation is repeated rapidly and continuously without interruption and without breakage. The rapidity with which the jars are stripped from the cores with this machine, especially without any breakage of the jars is surprisingly great, especially when consideration is given to the fact that a very heavy pull must be exerted on the core, and also to the fact that the thickness of the walls of the jar is not great and that the jar is formed of fragile material. The efficiency of the method and apparatus, and the practically negligible percentage of breakage, as far as I can discover, is due partly to the fact that the edges of the jar bear with substantially equal pressure against the face of the stripper plate, also partly to the fact that the direction of pull is directly in line with the core, and also in large measure to the fact that during the stripping operation the core and jar rest upon the firm horizontal support 20 which is parallel to the direction of pull. This supporting of the jar and core in the manner explained is of great importance, for during the process of the development of the invention it was found that if it be attempted to extract the core from the jar in any but a horizontal direction, say in a vertical direction, and if the core and jar be not supported or allowed to rest firmly on a support parallel to the direction of pull, the percentage of breakage is relatively large, whereas it is practically negligible when the core and jar are supported as on the horizontal plate 20, while the pull which draws the core from the jar is exerted on the core.

This apparatus and method are universal in the respect that they can be utilized for various sizes and dimensions of jars, it being only necessary to have a stripper plate for each size of core and jar; that is to say, when it is desired to strip a quantity of jars differing in size from those for which the machine had previously been used, it is only necessary to remove the stripper plate and replace it with a plate whose opening 25 corresponds with the shape and dimensions of the core of the second lot of the different size.

Having thus described my invention, what I claim is:

1. The method of stripping a rubber jar from a core on which the jar is formed and vulcanized, which consists in exerting a stripping pull between the core and jar, and while the pull is exerted supporting the jar and core on a surface substantially parallel to the direction of pull and substantially parallel to a face of the jar.

2. The method of stripping rubber jars from cores on which the jars are formed and vulcanized, which consists in exerting a pull on the core and resisting the pull on a surface engaged by the edges of the jar, and at the same time supporting the core and jar on a second surface at substantially right angles to the first named surface and substantially parallel to the direction of pull.

3. In an apparatus for stripping rubber jars from cores on which the jars are formed and vulcanized, a table having a flat surface for a core and the jar to be stripped therefrom, a stripper plate at substantially right angles to said surface and having an opening through which the core may pass, a motor having a power operated plunger, and means for connecting the plunger to the core, said motor through the connecting means exerting a pull on the core at substantially right angles to the said stripper plate and substantially parallel to said surface.

4. In an apparatus for stripping rubber jars from cores on which the jars are formed and vulcanized, a flat support for the core and jar, a stripper plate at substantially right angles to said support and having an opening through which the core may pass and constituting an abutment adapted to be engaged by the edges of the jar, and means adapted to be connected to the core to exert a pull on the core in the direction of the length thereof.

5. In an apparatus for stripping rubber jars from cores on which the jars are formed and vulcanized, a horizontal support for a core and jar, a vertical stripper plate having an opening through which the core may pass but smaller than the jar, and a power device having means connected thereto and adapted to be connected to the core to exert a pull at right angles to the stripper plate and parallel to said support.

6. In an apparatus for stripping rubber jars from cores on which the jars are formed and vulcanized, a horizontal table, a plate secured thereto and constituting a support for a core and a jar to be removed therefrom, upright arms at the front of said support, a stripper plate bearing against said arms and having an opening through which the core may pass but smaller than the jar so that a plurality of the edges of the jar will engage the face of the stripper plate, a power device supported on the table and having a flexible connecting means adapted to be attached to the core whereby a pull may be exerted on the core in a straight line in the direction of the length of the core and parallel to said first named plate and at right angles to the stripper plate.

In testimony whereof, I hereunto affix my signature.

HARRY L. BOYER.